Oct. 2, 1951 S. L. STRUVE ET AL 2,569,958
HOME PASTEURIZER WITH REMOVABLE INNER RECEPTACLE
AND SEALING MEANS THEREFOR
Filed Feb. 11, 1946 3 Sheets-Sheet 1
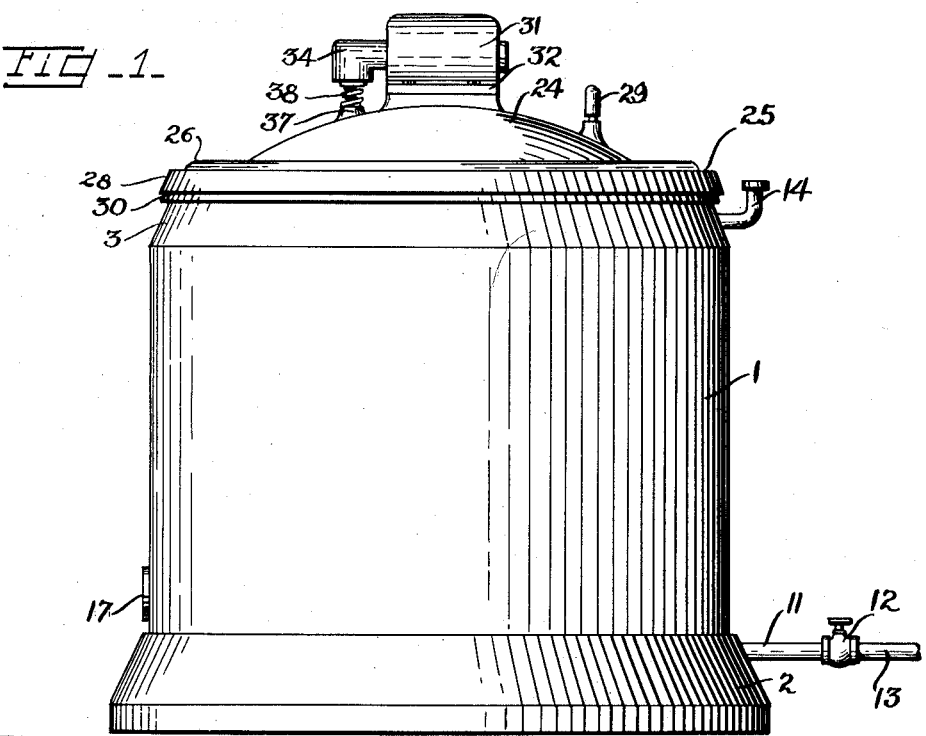
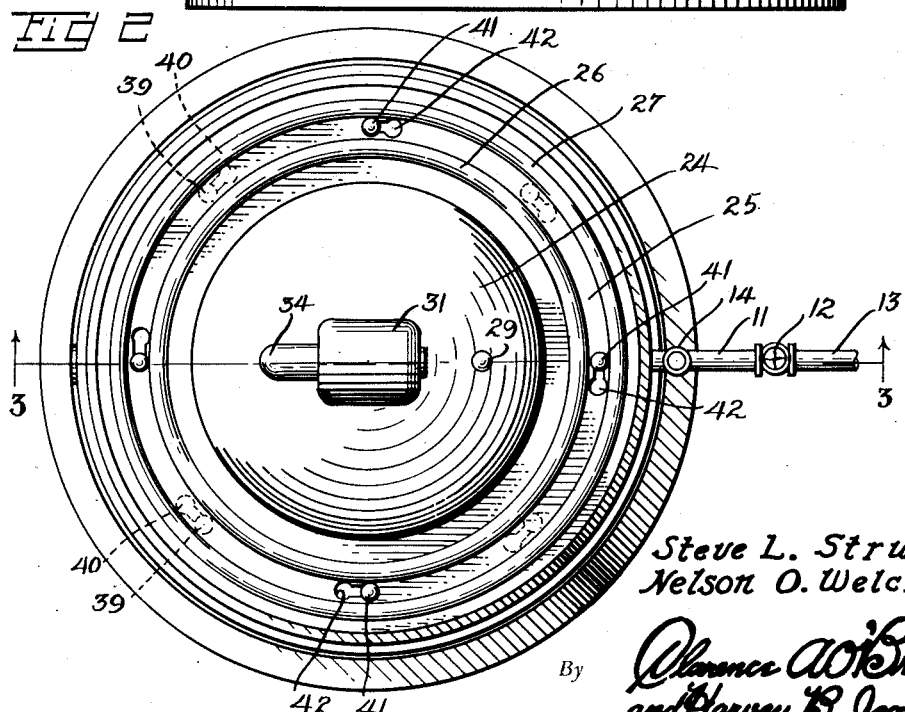
Inventor
Steve L. Struve
Nelson O. Welch,
By
Attorneys

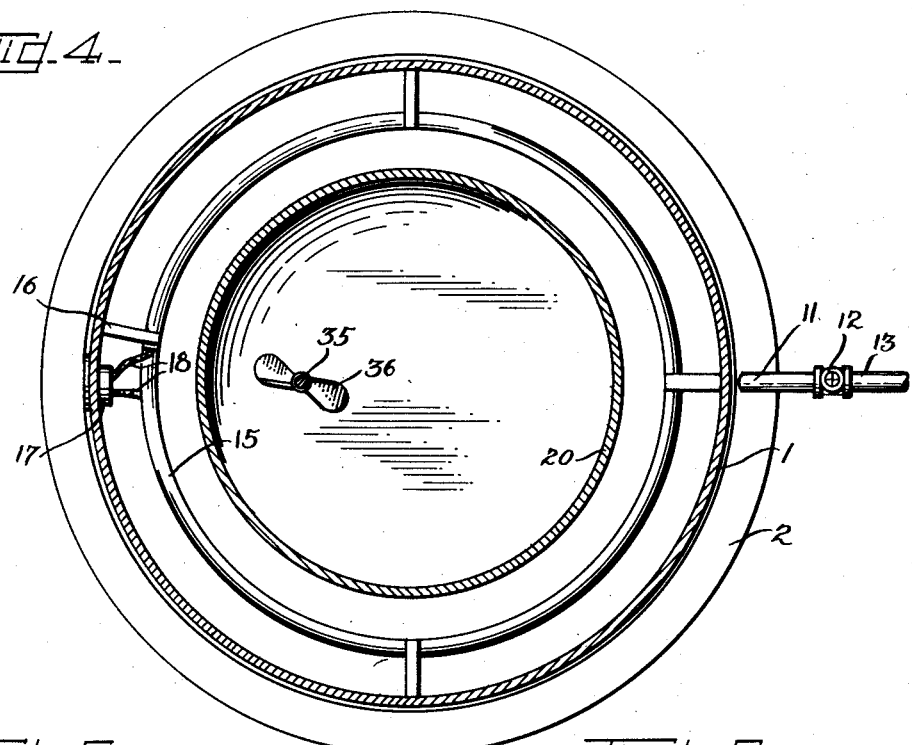
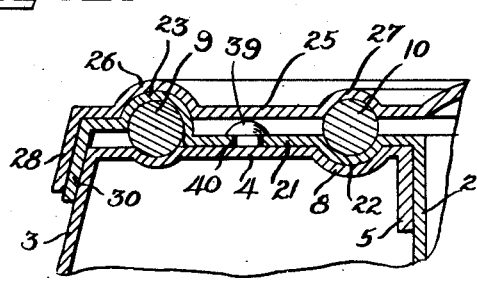
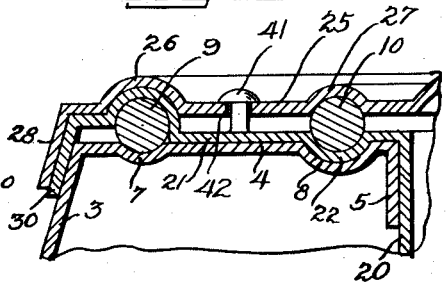
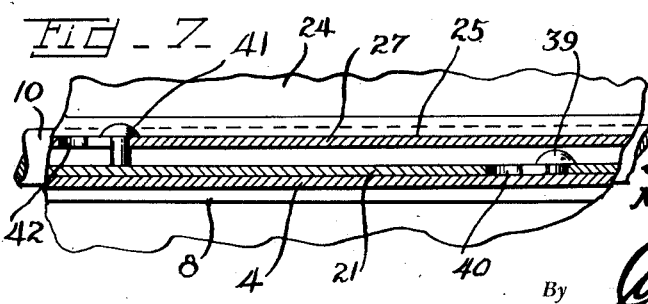
Inventor
Steve L. Struve
Nelson O. Welch,

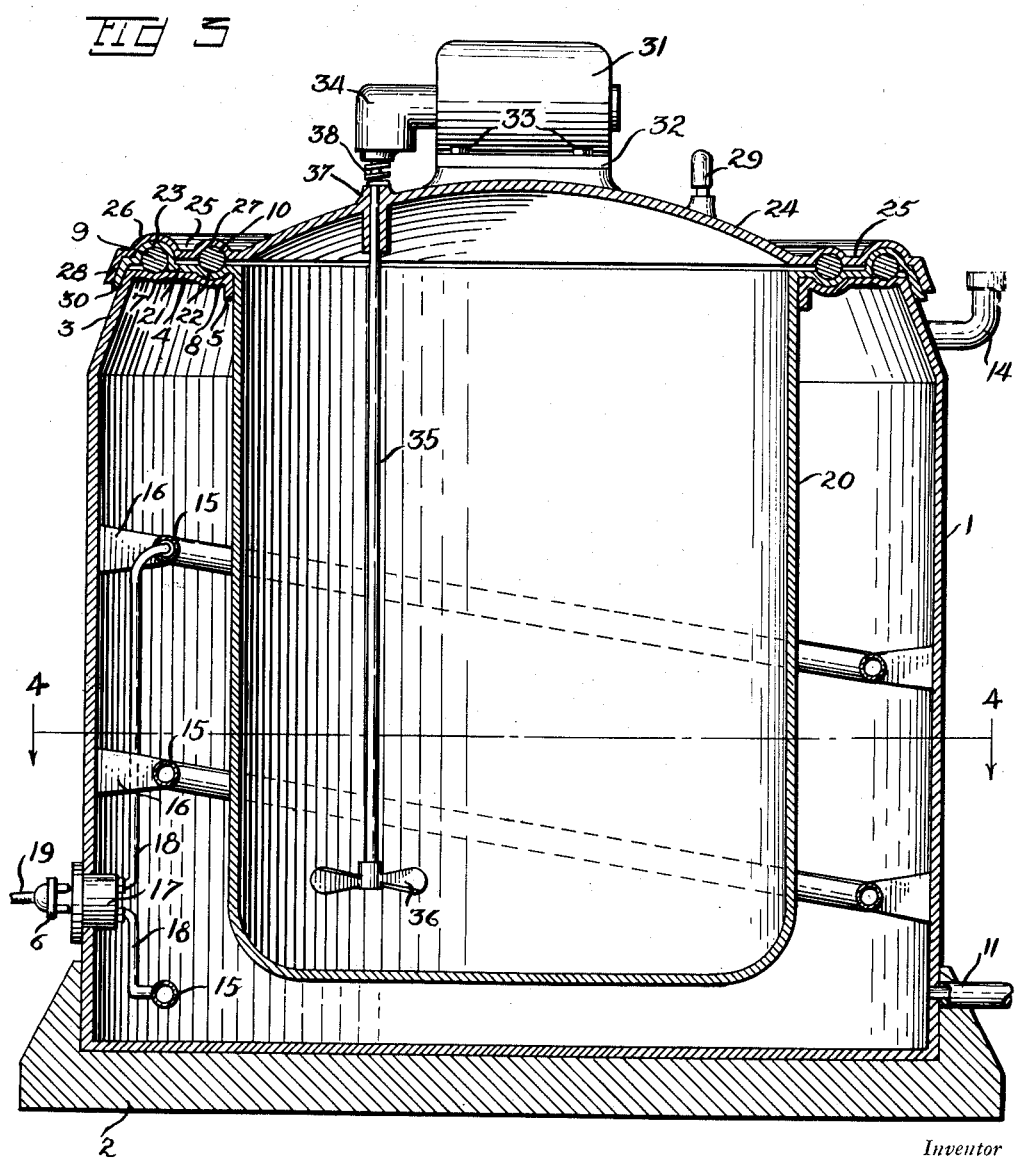

Patented Oct. 2, 1951

2,569,958

UNITED STATES PATENT OFFICE 2,569,958

HOME PASTEURIZER WITH REMOVABLE INNER RECEPTACLE AND SEALING MEANS THEREFOR

Steve L. Struve, Levelland, and Nelson O. Welch, Friona, Tex.

Application February 11, 1946, Serial No. 646,806

2 Claims. (Cl. 220—13)

This invention relates to pasteurizers and the like, and more particularly to a home pasteurizer or cooker.

An object of the invention is to provide an improved home pasteurizer and cooker including spaced inner and outer receptacles with a fluid between said receptacle, and means for heating said fluid.

Another object of the invention is to provide a home pasteurizer and cooker with an inner receptacle for containing the liquid to be pasteurized, and an outer surrounding receptacle for containing water which will be heated by a self-contained electric heating means, and an agitator in the inner receptacle driven by a motor supported upon a cover secured to and sealed on both the inner and outer receptacles.

A further object of the invention is to provide an improved home pasteurizer which will be highly efficient in use and relatively inexpensive to manufacture and produce.

Other objects will appear as the description proceeds.

In the accompanying drawings which form a part of this application,

Figure 1 is a side elevation of the improved home pasteurizer;

Figure 2 is a plan view of the improved home pasteurizer;

Figure 3 is a vertical sectional view taken on the line 3—3 of Figure 2;

Figure 4 is a transverse sectional view taken on the line 4—4 of Figure 3;

Figure 5 is an enlarged sectional view showing the head and slot securing means for holding the inner container to the outer container;

Figure 6 is an enlarged sectional view showing the head and slot locking arrangement for securing the cover member to the inner container, and Figure 7 is a fragmentary sectional view taken on a vertical arcuate plane through the rivet shown in Figure 2.

Like characters of reference are used throughout the following specification and the accompanying drawings to designate corresponding parts.

In carrying out the invention, there is provided an outer cylindrical container or receptacle 1 having a weighted base 2, and formed with an inwardly directed tapered upper end 3 the same being formed with the in-turned flange 4, and being bent downwardly to provide the annular collar 5. The annular concentric seats or grooves 7 and 8 are formed in the upper surface of the flange 4, and are provided to receive and support the round rubber sealing gasket rings 9 and 10.

A water inlet pipe 11 extends through the wall of the receptacle 1 adjacent its lower end, and is provided with a valve 12 to connect with a pipe 13 from a source of water supply (not shown).

An angled or elbow shaped water overflow pipe 14 extends through the wall of the receptacle 1 adjacent its upper end, and is opened to permit water to overflow from the receptacle as it expands when heated.

A helical electric heating element 15 is arranged within the receptacle 1 in spaced relation from its inner wall, and is supported on the insulated supporting standards 16 secured to said inner wall. The electric plug receiving housing 17 is secured to the wall of the receptacle 1, and is connected by means of the electric wiring 18 to the helical heating element 15, and controlled by means of a thermostat (not shown).

An electric cable 19 having a plug connector 6 is adapted to plug into said housing 17, and will be connected at its opposite end to a source of electric current (not shown).

An inner container or receptacle 20 is adapted to be supported in the outer receptacle 1 in spaced relation thereto, and is formed with an annular flange 21, which is provided with the annular concentric spaced grooves 22 and 23, said groove 22 being adapted to seat in the annular seat or groove 8 on the flange 4, to support the gasket ring 10, while the seat or groove 23 is adapted to overlie the gasket ring 9 supported in the seats or grooves 7 in the flange 4. The flange 21 is bent outwardly and downwardly to provide the tapered flange 30 overlying and contacting the tapered upper end 3 of the receptacle 1.

A dome-shaped cover 24 is provided to cover the inner receptacle 20, and is formed with the laterally extending annular flange 25 in which the spaced overlying ring gasket seats or grooves 26 and 27 are formed to overlie the seat 23 and ring gasket 10, respectively. The outer edge of the flange 25 is bent downwardly to form the annular tapered flange 28 which overlies and contacts the tapered annular flange 30 formed integrally with the inner receptacle 20.

A steam pressure gauge 29 will be connected through the dome shaped cover member 24 to prevent too great a steam pressure building up in the inner receptacle 20.

An electric motor 31 is mounted upon an insulating plate 32 on top of the cover 24, and is secured in place thereon by means of the bolts 33. A gear housing 34 for the motor encloses a worm gear and interengaging gear (not shown), said gear being secured on the upper end of the shaft 35 which supports the agitator blade 36 on its lower extremity to extend adjacent the lower end of the inner receptacle 20. A metal to metal seal 37 and coil spring 38 are used where the shaft 35 extends through the cover 24 to prevent air and dirt from getting into the liquid in the inner container or receptacle 20. The motor 31 will be connected to a source of electric current (not shown) and will be controlled by a switch (also not shown).

The spaced headed studs 39 will be positioned on the upper surface of the flange 4 and will cooperate and lock in the keyhole slots 40 formed through the flange 21 to hold the inner receptacle 20 to the outer receptacle 1, while headed studs 41 are formed on the flanges 21 and cooperate with and lock in the keyhole slots 42 on the flange 25 to hold the cover 24 on the inner receptacle 20.

The operation of the improved home pasteurizer will now be described in detail. When it is desired to pasteurize milk or other liquid, it is placed within the inner container or receptacle 20 and the cover 24 is locked in place upon the two receptacles, after which the valve 12 will be opened from the source of water supply to let water into the outer receptacle until it completely fills the same, whereupon the valve 12 is again closed. The electricity is plugged into the housing 17 and turned on and the switch (not shown) is turned on to cause the operation of the motor 31, which in turn rotates the shaft 35 with impeller 36 on its lower end to gently agitate the liquid in the inner container 20. The electric heating element 15 helically arranged within the outer container will be heated, and in turn will heat the water within said outer receptacle, and will heat the milk or liquid in the inner receptacle 20 to the desired temperature to pasteurize the same. After the pasteurizing operation has been completed, the electricity will be turned off and water from the water supply will be admitted to the outer receptacle so as to cool the liquid in the inner receptacle. When the liquid has been sufficiently cooled, the top of the pasteurizer will be removed and a separate top minus the motor will be secured thereon, and the inner container will be placed in a refrigerator so that the pasteurized liquid will be kept from spoiling.

From the foregoing description, it will be apparent that there has been provided a highly efficient form of home pasteurizer in which milk and other fluids may be pasteurized, and then cooled and stored in a refrigerator thereby providing safe drinks for people who live on farms and out of the way places, and are unable to secure the benefits of pasteurized milk from a dairy.

While the preferred embodiment of the invention has been illustrated and described, it will be understood that it is not intended to limit the scope of the invention thereto, as many minor changes in detail of construction may be resorted to without departure from the spirit of the invention.

Having thus described our invention what we claim as new and desire to secure by Letters Patent of the United States is:

1. A pasteurizer including an inner receptacle and an outer receptacle, a cover for said receptacles, an annular flange about said cover, an inturned flange on the top of the outer receptacle, an out-turned flange on the top of the inner receptacle, registering gasket seats in said flanges, and gaskets operatively associated with the seats, said seats being arranged in concentric pairs in each of said flanges, the inner of said gaskets directly contacting the inner of the seats in the cover flange and inner receptacle flange, and the outer of said gaskets directly contacting the outer of the seats in the flanges of the inner and outer receptacles.

2. A pasteurizer including an inner receptacle and an outer receptacle, a cover for said receptacles, an annular flange about said cover, an inturned flange on the top of the outer receptacle, an out-turned flange on the top of the inner receptacle, registering gasket seats in said flanges, and gaskets operatively associated with the seats, said seats being arranged in concentric pairs in each of said flanges, the inner of said gaskets directly contacting the inner of the seats in the cover flange and inner receptacle flange, and the outer of said gaskets directly contacting the outer of the seats in the flanges of the inner and outer receptacles, the flanges having bayonet fasteners to secure the same in gasket-contacting position.

STEVE L. STRUVE.
NELSON O. WELCH.

REFERENCES CITED

The following references are of record in the file of this patent:

UNITED STATES PATENTS

| Number | Name | Date |
|---|---|---|
| 277,833 | Cook | May 15, 1883 |
| 587,681 | Rand | Aug. 3, 1897 |
| 1,129,266 | Ziegler | Feb. 23, 1915 |
| 1,199,974 | Feldmeier | Oct. 3, 1916 |
| 1,277,724 | Hodgson | Sept. 3, 1918 |
| 1,438,594 | Goldberger | Dec. 12, 1922 |
| 1,527,771 | Baer et al. | Feb. 24, 1925 |
| 1,653,978 | Ballreich | Dec. 27, 1927 |
| 1,823,637 | Wright | Sept. 15, 1931 |
| 1,955,610 | Seipt | Apr. 17, 1934 |
| 1,984,956 | Anglim | Dec. 18, 1934 |

FOREIGN PATENTS

| Number | Country | Date |
|---|---|---|
| 17,537 | Great Britain | of 1895 |
| 27,208 | Great Britain | Nov. 26, 1913 |
| 128,027 | Germany | Feb. 9, 1911 |
| 501,867 | Great Britain | Mar. 7, 1939 |